United States Patent

Smith

[15] 3,693,182

[45] Sept. 19, 1972

[54] CARD RECORDER FOR TRANSCRIBING MAGNETIC INFORMATION

[72] Inventor: Kenneth B. Smith, St. Petersburg, Fla.

[73] Assignee: Honeywll Inc., Minneapolis, Minn.

[22] Filed: Aug. 31, 1970

[21] Appl. No.: 68,296

[52] U.S. Cl.......346/74 M, 179/100.2 E, 346/74 MP, 242/197

[51] Int. Cl...............................................G11b 5/86

[58] Field of Search..346/74 M, 74 MP; 179/100.2 E

[56] References Cited

UNITED STATES PATENTS 3,401,394 10/1968 Leonard et al........346/74 MP 3,529,101 10/1970 Dubord...............179/100.2 E

*Primary Examiner*—Bernard Konick
*Assistant Examiner*—Gary M. Hoffman
*Attorney*—Fred Jacob and Ronald T. Reiling

[57] ABSTRACT

A recording apparatus transcribes data from an information carrier, which is coded with variations in soft magnetic material, to magnetic tape. A carriage, supporting a asset of magnetic tape and a permanent magnet which is positioned near a portion of tape, passes over the information carrier locating the permanent magnet and a section of tape adjacent the magnetic coding. As the tape is transported within the cassette during the pass of the carriage, the data coded on the carrier is recorded on the tape. the

4 Claims, 4 Drawing Figures

PATENTED SEP 19 1972

3,693,182

SHEET 1 OF 2

INVENTOR.
KENNETH B. SMITH
BY
ATTORNEY

INVENTOR.
KENNETH B. SMITH
BY
[signature]
ATTORNEY

CARD RECORDER FOR TRANSCRIBING MAGNETIC INFORMATION

BACKGROUND OF THE INVENTION

This invention relates to apparatus for recording stored data, particularly data stored in the form of variations in soft magnetic material on an information carrier.

Co-pending application of Howard M. Fleming, filed in May 21, 1970, Ser. No. 39,206, and assigned to the assignee of the present invention describes a method for transcribing data from a plastic identification card on which is coded a magnetically readable information stream. Binary information, coded by the presence or absence of magnetic material in the information stream, is recorded onto magnetic tape which overlies in the coded data by passing a magnet past the information.

The magnet produces a flux of sufficient strength to be distorted by the soft magnetic material whereby the magnetic tape is permanently magnetized in accordance with the data stored in the form of the soft magnetic material.

The present invention provides a recording device for the transcription of data in accordance with the above recording principle.

SUMMARY OF THE INVENTION

The invention provides a device for transcribing data stored as variations in soft magnetic material onto magnetizable tape. According to a feature of the invention, a carriage carries a cassette of magnetic tape over the data stored within an information carrier. The cassette includes two spools for the transport of tape as the carriage moves across the information carrier. Also inserted within the cassette is a permanent magnet which is positioned above the section of magnetic tape that passes over the stored data as the carrier is traversed by the carriage. Preferably the magnet is of sufficient strength to produce a magnetic flux which is distorted by the soft magnetic variations and so permanently by magnetizes the magnetic tape.

According to another feature of the invention the permanent magnet has a gap adjacent the tape for maintaining a flux path through the tape and the information carrier.

According to yet another feature of the invention the magnetic tape is transported in a direction opposite to the direction in which the cassette traverses the carrier.

According to still another feature of the invention the magnetic tape is transported at substantially the same speed as is the cassette. This feature results in there being no relative motion between the magnetic tape and the information carrier and there being a relative motion of the magnet over the tape and the carrier at the traversing speed of the carriage.

According to another feature of the invention the carriage contains a print roller so that the latter can press inked documents over embossings which may accompany the data stored as soft magnetic materials on the carrier. This feature provides a legible hard copy.

According to yet another feature of the invention the spools within the cassette are driven by spindles within the carriage which are retractable for the ease of cassette removal.

According to still another feature of the invention cassette arms are positioned within the carriage to mate with notches on each side of the cassette in order to lock the cassette in position for engaging the spindles with the spools and for the recording traverse of the carriage.

These and other features which are considered to be characteristic of this invention are set forth with particularity in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
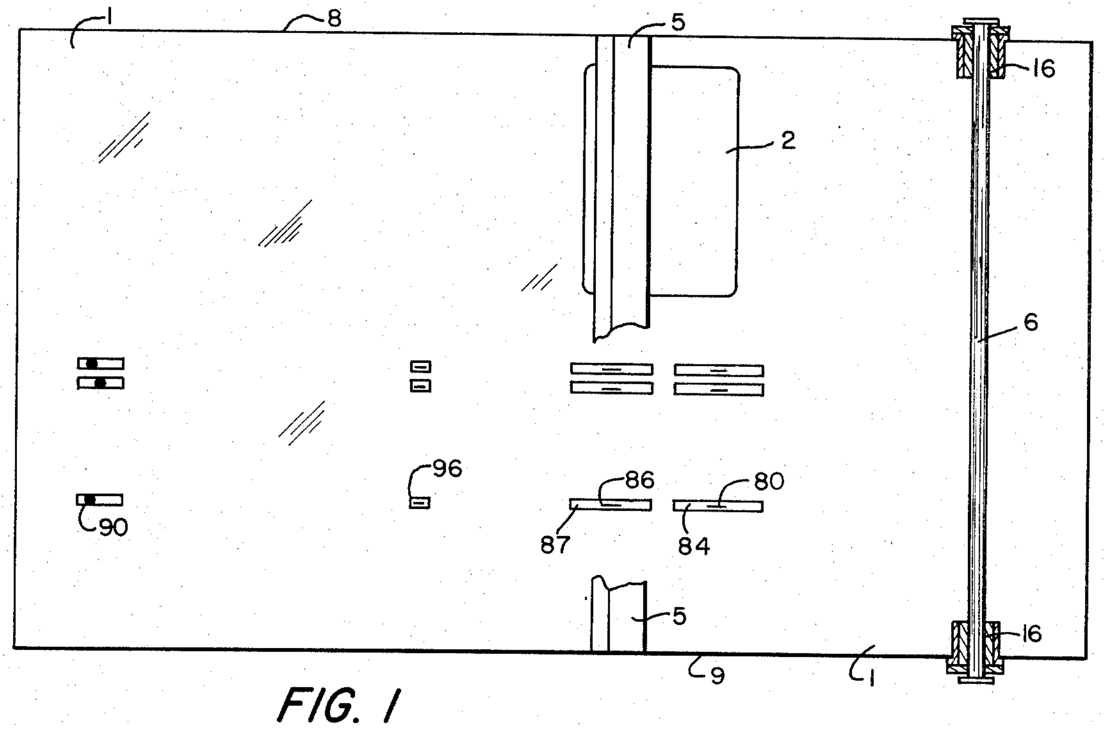
FIG. 1 is a top plan view of a recorder embodying features of the invention, having portions of the structure omitted for clarity.

In FIG. 1 is shown a face plate 1 upon which is located card station 2. Card station 2 is a substantially rectangular area for supporting a credit card or similar information carrier for visual reading and transcription of card data to other recording media in order to evidence a business transaction. The card to be used with this device is that described in co-depending application of Howard M. Fleming, filed May 21, 1970, Ser. No. 39,206, and assigned to the assignee of the present invention. An easily removable plastic identification card is coded with a magnetically readable information stream.

The information stream is in the form of binary bits at predetermined bit locations. Each binary ONE at any bit location is represented by a deposit of soft magnetic material, e.g., material having a high permeability and low remanence, embedded and held within discrete depressions in the surface of the card. The depressions extend transverse to the direction of the information stream, and are preferably formed by scoring the surface of the card. The deposits are subsequently placed in these depressions and a plastic coat covers and protects the soft magnetic deposits within the depressions. At each binary bit location the absence of a deposit filled depression is indicative of binary ZERO.

In accordance with conventional practice, the information stream also includes binary timing bits and parity bits. Because the deposits are composed of soft magnetic material, they are significantly magnetized only temporarily during exposure to an external magnetic flux. The card also includes information appearing in the form of human readable, alphabetic or numeric embossings that project outwardly from the card.

The face plate 1 also supports a set of paper sheets interleaved with carbons. A portion of the sheets or the set of sheets overlies the embossings from the card.

A guide bar 5 and guide shaft 6 traverse face plate 1 and are disposed parallel to the information stream of a card within station 2. The bar 5 and shaft 6 are connected to face plate 1 by means of wall supports 8 and 9.

Figure 2:
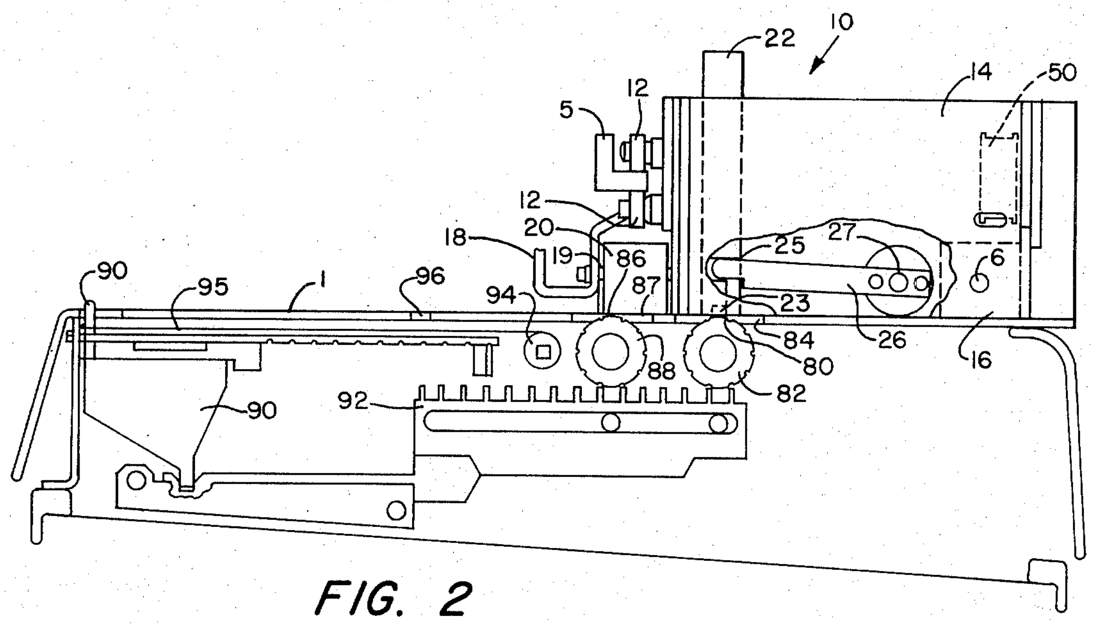
FIG. 2 is a sectional elevation view of the recorder embodying features of the invention.

Carriage 10, shown in FIG. 2, is carried by the guide bar 5 and guide shaft 6 to traverse the face plate 1 and a card lying within the station 2. Two rows of rollers 12, attached to a housing 14 of the carriage 10, are arranged in staggered formation to co-operate with the guide bar 5. The guide shaft 6 extends through housing 14 and is supported by bearings 16 which are attached to housing 14 to provide a track for the linear motion of the carriage 10.

A front bracket 18 is attached to the housing 14 beneath the bottom row of rollers 12. Axle 19 is connected horizontally between the bracket 18 and the housing 14 to support a print roller 20, which rotates in the direction of motion of carriage 10.

A tape cassette 22 is located within the housing 14, behind print roller 20. Cassette 22 is of a conventional type available commercially. Cassette 22 contains two spools to which is attached a length of magnetic tape 23. The cassette 22 is oriented with its magnetic tape 23 exposed to the surface of the plate 1 and the magnetic information stream of a card lying in the station 2 when carriage 10 traverses the card. The cassette 22 has notches 25 at each end adjacent the tape 23, and is held in place by two cassette arms 26 which are mounted to a shaft 27 that is rotatably fixed to housing 14.

The ends of the cassette arms 26 are shaped for mating with their respective notches 25.

Figure 3:
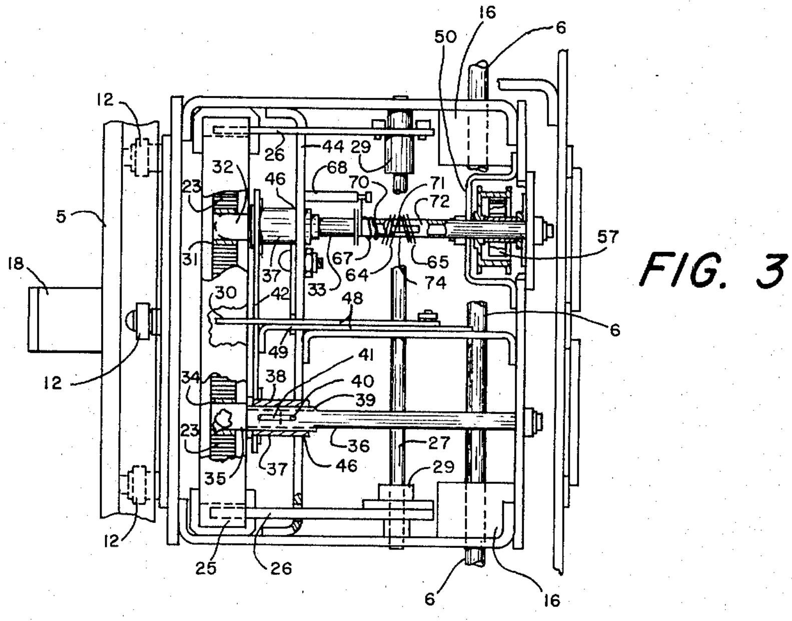
FIG. 3 is a sectional plan view of the recorder carriage of FIG. 2.

A permanent magnet 30 in accordance with the present invention is inserted within the cassette 22, as shown in FIG. 3, and above a portion of the magnetic tape 23 which is exposed to the surface of the plate 1. The take-up spool 31 of the cassette 22 is engaged by the head 32 of a drive spindle 33, which is rotatably connected to housing 14 at its opposite end. Likewise, the tape spool 34 is engaged by a head 35 of a spindle 36. The heads 32 and 35 are linked to their respective spindles by means of sleeves 37, which allow for linear motion of heads 32 and 35 along the forward portion of their respective spindle lengths. Sleeve 37 has an outer surface 38, which has a low coefficient of friction such as NYLON or TEFLON, and an inner surface 39 of metal which makes contact with the spindles 33 and 36.

The relative movement of the heads 32 and 35 with respect to the spindles 33 and 36 is given bounds by the mating of a peg 40 located on the forward end of each spindle and slot 41 which is within the interior metal surface 39 of the sleeves 37. Furthermore, the movement of heads 32 and 35 are fixed with respect to one another by means of a connecting plate 42, which parallels the side surface of the cassette 22. The permanent magnet 30 is also attached to the plate 42. The permanent magnet 30 and the heads 32 and 35 are aligned within the cassette 22 in their respective locations by means of a retaining wall 44 which is affixed to the interior of the housing 14. The retaining wall 44 contact the exterior surfaces of sleeves 37 via apertures 46 to provide the necessary alignment. An engagement arm 48 is connected to the connecting plate 42 and extends away from cassette 22 toward the interior of housing 14. A movement of the arm 48 away from or toward cassette 22 determines whether the magnet 30 and the heads 32 and 35 are to be engaged with cassette 22.

Figure 4:
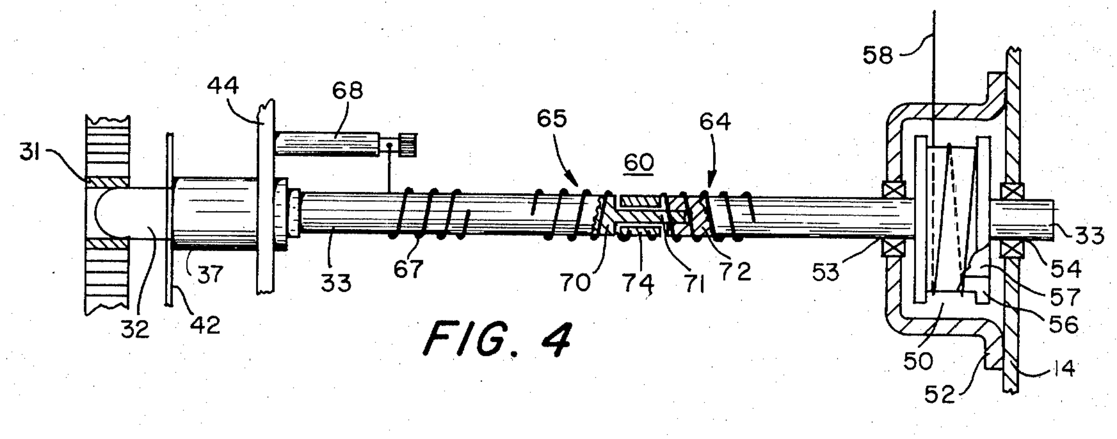
FIG. 4 is a schematic of the drive spindle and drum assembly of the recorder carriage of FIG. 3.

As shown in FIGS. 3 and 4, the drive spindle 33 is driven by drum 50 and in turn drives the take-up spool 31, which provides for the transport of the tape 23 from the source spool 34 to the take-up spool 31.

Shown in FIG. 4 is the drum 50 and a drive spindle 33 which constitute the drive mechanism for the transport of the tape 23 within the cassette 22. Drum 50 is attached to housing 14 and has an outer shell 52 which surrounds drive spindle 33. The shell 52 has a bearing 53 through which spindle 33 passes in order to insure rotational movement of the spindle 33 without interference from the shell 52. Spindle 33 extends through the drum 50 to the housing 14 where it is carried by a bearing 54 set in the housing 14. Within the shell 52 is a drum cylinder 56 which is attached to, and concentric with the spindle 33. A cable 58 is wound around drum cylinder 56 and extends through the shell 52 and the housing 14 to attach to the wall support 8.

At a rest position, prior to any translation of the carriage 10 and before transcription of data from a card within station 2, the drum cylinder 56 is fully wound by the cable 58 in a circumferential direction opposite to that in which the tape 23 will be taken up by the spool 31. Within the drum cylinder 56 is a strong flat wound clock spring 57 which tightens with the travel of carriage 10, away from the wall support 8, and toward wall support 9, as cable 58 unwinds from the cylinder 56 and returns the carriage 10 to the rest position adjacent the wall support 8 by rewinding the cable 58 onto the drum cylinder 56 at the end of each traverse i.e., a clutch releases and a coiled spring retracts the carriage.

During every return of carriage 10, a joint 60 which is shown in cross-sectional form within the spindle 33, together with springs 64, 65, and 67 provide for maintenance of the take-up spool 31 in a stationary position. Spindle 33 at joint 60 is shown in FIG. 4 to include a male portion 70, having a male member 71, mating with a spindle female portion 72 with an intermediate portion 74 between the portions 70 and 72 and surrounding the male member 71. Spring 64 is wound in the same circumferential direction as is cable 58 and frictionally encompasses the intermediate portion 74 and the female portion 72 in order to apply a positive torque drive to intermediate portion 74 when the carriage 10 makes its first traverse across face plate 1. When the carriage 10 is returning to its rest position, the spring 64 slips imparting no torque to intermediate portion 74 and thus no torque to rotate the take-up spool 31.

The spring 65 is wound in a circumferential direction opposite that of the spring 64 and frictionally encompasses the male portion 70 and the intermediate portion 74 without interferring with spring 64. The spring 65 applies limited torque drive from intermediate portion 74 to the male portion 70 in order to drive the take-up spool 31 and allow the tape 23, when taut, to retard or arrest the rotation of the male portion 70.

The spring 67 is frictionally wound about shaft 33 in the same circumferential direction as is spring 65 and is positioned between the retaining wall 44 and the spring 65 to anchor around post 68 which is attached to retaining wall 44. The spring 67 insures that the shaft 33 turn only in the take-up direction by slipping when a torque is imparted through the spindle 33 to the spool 31, when carriage 10 is making its first traverse, and by imparting a torque to the spindle 33 which would counter any torque translating through shaft 33 from the location of drum cylinder 56, as carriage 10 is returning to its rest position.

The magnetic tape 23 is wound about the take-up spool 31 such that the tape 23 is transported in a direction opposite that of the motion of the carriage 10 from its rest position to traverse the face plate 1. Since the speed of rotation of the drum cylinder 56 is dependent on the speed of carriage 10 as it traverses plate 1, the tape 23 is transported at the same speed as is carriage 10. As carriage 10 is carried by the guides 5 and 6 over card station 2, the magnetic tape 23 is exposed to the magnetically readable information stream within a card lying on station 2. The information in the information streams is imparted to and recorded onto the tape 23 by the permanent magnet 30 which is positioned within the cassette 22 just above the portion of tape 23 so exposed. Also, with the first traverse of carriage 10, the print roller 20 makes contact with a set of sheets interleaved with carbons between it and the embossings upon the card to provide a hard copy of information represented by embossings on the card.

The permanent magnet 30 has an air gap which extends transversely across the surface of tape 23. In the air gap, the magnetic flux field of the magnet 30 fringes and extends through the magnetic tape 23 as well as the card. The flux field of the magnet 30, which is stationary with respect to cassette 22, permanently magnetizes the tape 23, which is moving relative to the magnet 30. Since the tape 23 is transported away from the traversing movement of carriage 10 at the speed of carriage 10, there is no relative motion between tape 23 and a card lying within the card station 2. Thus, there exists a relative motion of the permanent magnet 30 over the card and the tape 23 at the speed and in the direction of the traversing carriage 10. Each deposit of soft magnetic material within a card, lying within station 2, distorts the magnetic flux field of the magnet 30 moving relative to its vicinity. The permanent magnet 30, then, at its gap permanently magnetizes the part of tape 23 adjacent each magnetic deposit differently than the portion of the tape 23 between the deposits. Each bit having a value of ONE is imparted onto the tape 23 as a magnetic discontinuity. Each bit having a value of ZERO is represented by no discontinuity.

As the carriage 10 traverses past the card station 2, the magnet 30 records further information onto the tape 23. This information, as shown in FIGS. 1 and 2, is embedded as soft magnetic binary deposits 80 on the peripheral surfaces of several coaxially-aligned magnetic recording wheels 82. A portion of each peripheral surface having information projects through a window 84 aligned with the tape 23. Also, information corresponding to that projecting through the window 84 is recorded onto the set of carbon-interleaved sheets lying above the card within station 2. This is done as the print roller 20 presses the sheets against a font of alphabetic or numeric embossings 86 which project through a window 87 from the embossed peripheral surface of each of several coaxially-aligned type wheels 88. The information on the wheels 82 and 88 is provided, i.e., information projects through windows 84 and 87, by manually moving longitudinally movable variable entry switches 90. Such longitudinal movement causes the switches 90 to move longitudinally movable control racks 92 whose teeth engage corresponding teeth on portions of the periphery of the wheels 82 and 88. The entry switches 90 are also connected to respective wheels 94 by means of plastic strips 95 whose top surfaces have alphabetic or numeric characters which project through a window 96 in the face plate 1 for visual reading by an operator of information being entered into carriage 10 through the wheels 82 and 88. When an operator moves the carriage 10 to the end of guides 5 and 6, so as to move the magnet 30 and the print roller 20 to the fully traversed position above the face plate 1; all the magnetic information on a card in station 2, as well as that to which the wheels 82 and 88 were set, is recorded onto the tape 23 and the sheets lying above the card on the station 2. After a business transaction is completed, the set of paper sheets and the card within station 2 are removed and a new card and new sheets are placed upon station 2 for the recording transcription of another transaction.

Obviously, many modifications of the present invention are possible in the light of the above teaching. It is therefore to be understood that, in the scope of the appended claims, the invention may be practiced otherwise than as specifically described.

What is claimed is:

1. A device for transcribing information from a card coded information carrier to a magnetic tape comprising:

a. support means for positioning said information carrier;

b. a tape cassette having said magnetic tape and a take up spool and a source spool for the transport of said magnetic tape;

c. carriage means connected to said support means for carrying said tape cassette over said information carrier, said tape cassette being positioned on said carriage means so as to traverse said information carrier when said carriage means is moved over said information carrier;

d. said carriage means including tape drive means engaged with and driving said spools for transporting said magnetic tape from said source spool to said take up spool in response to said carriage means traversing said information carrier;

e. a permanent magnet mounted on said carriage means and inserted in said tape cassette and over said magnetic tape and having a gap adjacent said tape for generating a flux field of sufficient strength to permanently magnetize said magnetic tape;

f. engaging means connected to said permanent magnet for aligning said permanent magnet over said magnetic tape and for simultaneously placing said tape drive means in contact with said spools; and, g. said carriage means also including connecting means for locking said tape cassette within said carriage means for attaching said tape drive means with said spools.

2. The device as defined in claim 1 wherein said tape drive means disengages from said spools upon a return traverse of said carriage means.

3. The recording apparatus of claim 2 wherein said magnetic tape is transported in a direction opposite to the direction in which said cassette is carried.

4. The recording apparatus of claim 3 wherein said magnetic tape is transported at substantially the same speed as is the cassette.

* * * * *